United States Patent
Langton et al.

(10) Patent No.: US 10,389,740 B2
(45) Date of Patent: *Aug. 20, 2019

(54) DETECTING A MALICIOUS FILE INFECTION VIA SANDBOXING

(71) Applicant: Juniper Networks, Inc., Sunnyvale, CA (US)

(72) Inventors: Jacob Asher Langton, Oakland, CA (US); Daniel J. Quinlan, San Francisco, CA (US); Kyle Adams, Brisbane, CA (US); Declan Conlon, Sydney (AU)

(73) Assignee: Juniper Networks, Inc., Sunnyvale, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/620,388

(22) Filed: Jun. 12, 2017

(65) Prior Publication Data

US 2017/0346838 A1    Nov. 30, 2017

Related U.S. Application Data

(63) Continuation of application No. 14/675,422, filed on Mar. 31, 2015, now Pat. No. 9,680,845.

(51) Int. Cl.
*H01L 29/06* (2006.01)
*H04L 29/06* (2006.01)
(Continued)

(52) U.S. Cl.
CPC .......... *H04L 63/1416* (2013.01); *G06F 21/53* (2013.01); *G06F 21/566* (2013.01);
(Continued)

(58) Field of Classification Search
CPC ............. H04L 63/1416; H04L 63/1408; H04L 63/1441; H04L 63/1458; G06F 21/552
See application file for complete search history.

(56) References Cited

U.S. PATENT DOCUMENTS 8,867,583 B2    3/2014    Polyakov et al.
8,789,174 B1    7/2014    Gupta
(Continued)

FOREIGN PATENT DOCUMENTS

| CN | 102160048 A | 9/2008 |
|---|---|---|
| CN | 102160048 A | 8/2011 |
| EP | 2843904 | 3/2015 |

OTHER PUBLICATIONS

Extended European Search Report corresponding to EP 15186539, dated Sep. 15, 2016, 8 pages.

*Primary Examiner* — Baotran N To
(74) *Attorney, Agent, or Firm* — Harrity & Harrity, LLP

(57) ABSTRACT

A device may receive a trigger to determine whether a malicious file is operating on a client device. The device may determine a network activity profile associated with the malicious file based on receiving the trigger to determine whether the malicious file is operating on the client device. The network activity profile may include information regarding network activity associated with the malicious file when the malicious file is executed in a testing environment. The device may monitor network activity associated with the client device. The device may determine that the network activity associated with the client device matches the network activity profile associated with the malicious file based on monitoring the network activity associated with the client device. The device may provide information indicating that the network activity associated with the client device matches the network activity profile associated with the malicious file.

20 Claims, 7 Drawing Sheets

(51) Int. Cl.
*H04L 29/08* (2006.01)
*H04L 12/26* (2006.01)
*G06F 21/53* (2013.01)
*G06F 21/56* (2013.01)

(52) U.S. Cl.
CPC ...... *H04L 43/0876* (2013.01); *H04L 63/0227* (2013.01); *H04L 63/1408* (2013.01); *H04L 67/303* (2013.01)

(56) References Cited

U.S. PATENT DOCUMENTS

| | | |
|---|---|---|
| 8,819,826 B2 | 8/2014 | Sallam |
| 9,223,966 B1 | 12/2015 | Satish |
| 9,680,845 B2 | 6/2017 | Langton et al. |
| 2008/0016339 A1 | 1/2008 | Shukla |
| 2010/0077481 A1 | 3/2010 | Polyakov et al. |
| 2011/0185423 A1 | 7/2011 | Sallam |
| 2013/0097706 A1 | 4/2013 | Titonis et al. |
| 2014/0047544 A1 | 2/2014 | Jakobsson |
| 2014/0090058 A1* | 3/2014 | Ward .................. H04L 63/1433 726/23 |
| 2014/0090061 A1 | 3/2014 | Avasarala et al. |
| 2015/0026808 A1* | 1/2015 | Perdisci .................. G06F 21/56 726/23 |
| 2015/0067866 A1* | 3/2015 | Ibatullin ............... G06F 21/554 726/25 |
| 2015/0222661 A1* | 8/2015 | Ibatullin ............... G06F 21/554 726/23 |

\* cited by examiner

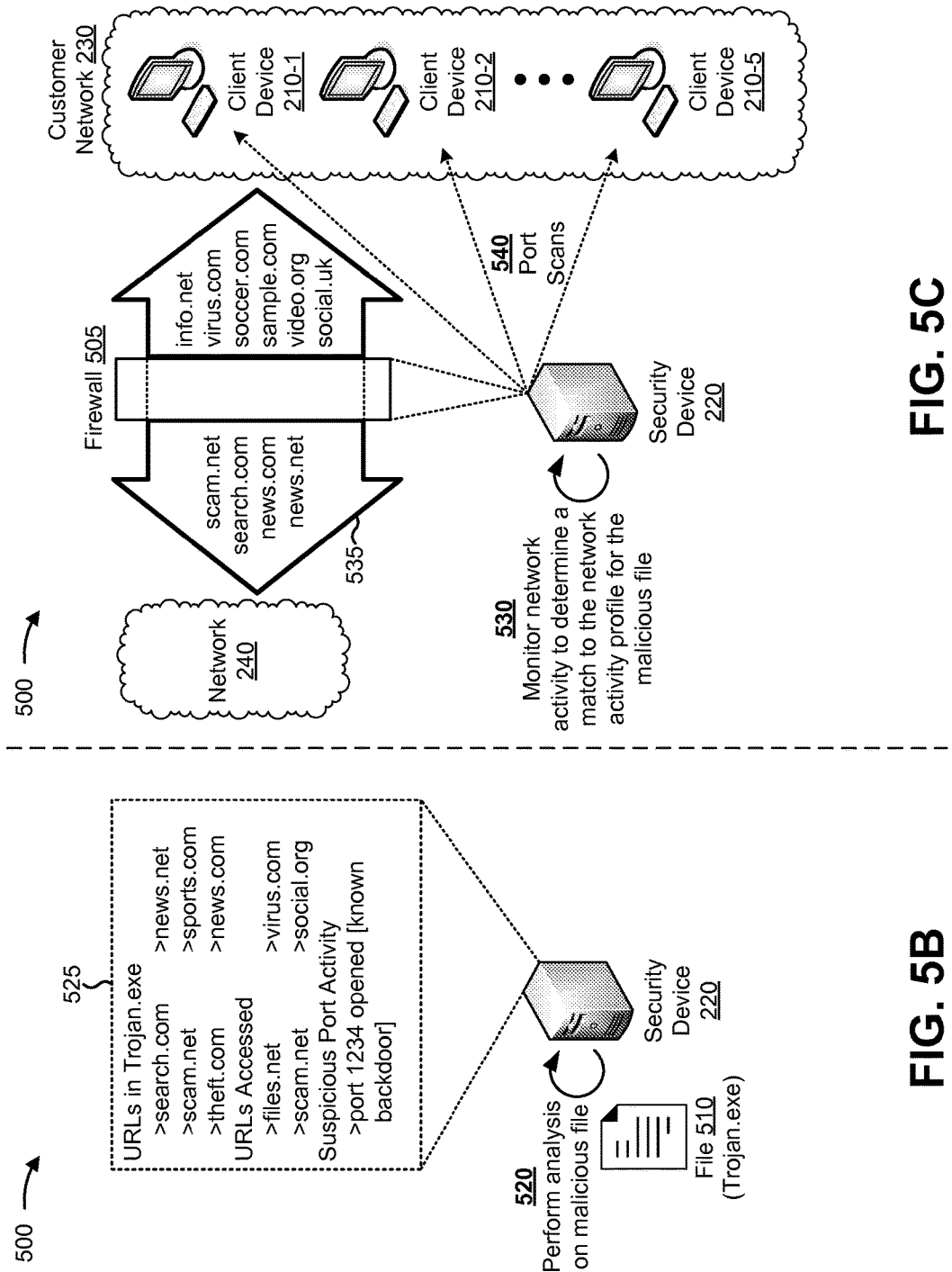

DETECTING A MALICIOUS FILE INFECTION VIA SANDBOXING

RELATED APPLICATION

This application is a continuation of U.S. patent application No. 14/675,422, filed Mar. 31, 2015 (now U.S. Pat. No. 9,680,845), which is incorporated herein by reference.

BACKGROUND

A malicious file, such as malicious software ("malware"), may refer to any software used to disrupt computer operations, gather sensitive information, gain access to private computer systems, or the like. A malicious file may include a variety of types of hostile or intrusive software, including a computer virus, a worm, a Trojan horse, ransomware, spyware, adware, scareware, or other malicious software.

A client device on a customer network may download a file that is a malicious file during operation of the client device. A malicious file detection tool associated with a security device may determine that the file is malicious based on performing analysis on the file when the file is downloaded to the client device. The file may be executed on and infect the client device before the malicious file detection tool completes analysis on the file. The file may also infect other client devices on the customer network.

SUMMARY

According to some possible implementations, a device may receive a trigger to determine whether a malicious file is operating on a client device. The device may determine a network activity profile associated with the malicious file based on receiving the trigger to determine whether the malicious file is operating on the client device. The network activity profile may include information regarding network activity associated with the malicious file when the malicious file is executed in a testing environment. The device may monitor network activity associated with the client device. The device may determine that the network activity associated with the client device matches the network activity profile associated with the malicious file based on monitoring the network activity associated with the client device. The device may provide information indicating that the network activity associated with the client device matches the network activity profile associated with the malicious file.

According to some possible implementations, method may include monitoring, by a device, network activity associated with a set of client devices. The network activity associated with the set of client devices may include first network activity associated with a set of network addresses and second network activity associated with a set of ports of the set of client devices. The method may include matching, by the device, the network activity associated with the set of client devices to a network activity profile of a set of network activity profiles. The network activity profile may be particular network activity observed when testing a malicious file, associated with the network activity profile, in a sandboxing environment. The method may include providing, by the device, a notification that the malicious file is operating on a client device, of the set of client devices, based on matching the network activity associated with the set of client devices to the network activity profile.

According to some possible implementations, a computer-readable medium may include one or more instructions that cause one or more processors to determine a network activity profile associated with a malicious file. The network activity profile may include information regarding network activity associated with the malicious file when the malicious file is executed in a testing environment. The one or more instructions may cause the one or more processors to monitor network activity associated with the client device. The one or more instructions may cause the one or more processors to determine that the network activity associated with the client device matches the network activity profile associated with the malicious file based on monitoring the network activity associated with the client device. The one or more instructions may cause the one or more processors to provide information indicating that the network activity associated with the client device matches the network activity profile associated with the malicious file.

BRIEF DESCRIPTION OF THE DRAWINGS

FIGS. 5A-5D are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A malicious file may include a ransomware file, a spyware file, or the like. Often the malicious file may be downloaded to a client device when a user intends to download a legitimate file, such as a software program, a data file, or the like. For example, the user may download a legitimate (non-malicious) file and may inadvertently download a malicious file while downloading the legitimate file. The malicious file may be associated with contacting one or more network resources (e.g., servers, client devices, etc.) to exfiltrate data, replicate, infiltrate additional malicious files, or the like. A malicious file prevention service may develop signatures (e.g., hashes) for common malicious files that may be utilized to identify malicious files on a particular client device. However, a malicious file may be encountered on client devices of a customer network before a signature is developed for the malicious file. Implementations, described herein may utilize a testing environment to generate a network activity profile for a malicious file and monitor network activity of a set of client devices to determine whether the malicious file is operating on a client device of the set of client devices.

Figure 1:
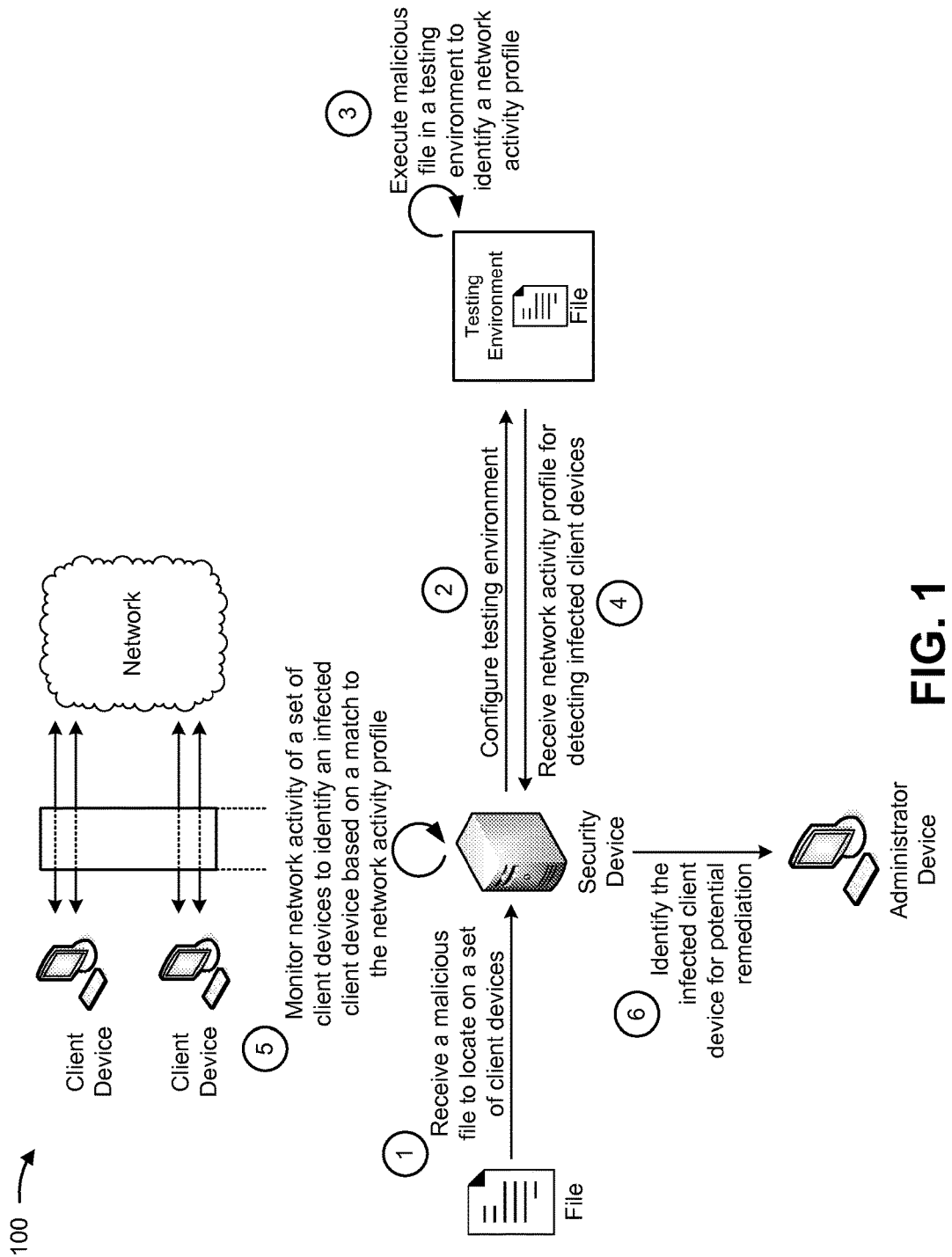
FIG. 1 is a diagram of an overview of an example implementation described herein.

FIG. 1 is a diagram of an overview of an example implementation 100 described herein. As shown in FIG. 1, and by reference identifier 1, a security device may receive a malicious file to determine whether the malicious file is operating on a client device of a set of client devices. For example, when monitoring downloading or downloaded files by the set of client devices, the security device may receive a copy of the downloading/downloaded files, and may determine that a first client device, of the set of client devices, downloads a particular file that is the malicious file. In this case, the security device may determine whether the malicious file is operating on the client device, another client device of the set of client devices, or the like.

As further shown in FIG. 1, and by reference identifier 2, the security device may configure a testing environment, such as a sandboxing environment, for executing the malicious file. As shown by reference identifier 3, the security device may cause the malicious file to be executed in the testing environment and may determine a network activity profile. A network activity profile may refer to network activity that is determined to correspond to a particular malicious file operating on a particular client device (i.e., the particular client device being infected by the particular malicious file). For example, the security device may determine that during operation of the malicious file, packets are attempted to be sent to a particular network address known to be associated with malicious files. Additionally, or alternatively, the security device may determine that a particular port is utilized for communication during operation of the malicious file. Additionally, or alternatively, the security device may provoke a network activity reaction when the malicious file is executing in the testing environment, such as by taking a virtual machine on which the malicious file is executing off a network, resetting an Internet protocol (IP) lease associated with the virtual machine, or the like. As shown by reference identifier 4, the security device may receive results of executing the malicious file in the testing environment.

As further shown in FIG. 1, and by reference identifier 5, the security device may monitor incoming and outgoing network traffic associated with a set of client devices communicating to/from a network (e.g., the Internet). For example, the security device may operate a firewall between a customer network, which includes the set of client devices, and the Internet, and may monitor packets entering/exiting the customer network through the firewall. Additionally, or alternatively, the security device may perform a port scan of the set of client devices to determine network activity associated with one or more ports of the set of client devices. Additionally, or alternatively, the security device may provoke a network activity reaction from the client device (e.g., by disconnecting the client device from a network, resetting an IP lease of the client device, or the like).

The security device may determine whether network activity, observed via the firewall, the port scan, provoking the network activity reaction, or the like, corresponds to the network activity profile for the malicious file. For example, the security device may determine that a particular client device is accessing the same network address that was attempted to be accessed when the malicious file was being operated in the testing environment. In another example, the security device may determine that the particular client device is communicating via a port that was attempted to be communicated with when the malicious file was being operated in the testing environment and is associated with a previously detected malicious file. In another example, the security device may observe the same network activity reaction (e.g., accessing a network address, deleting a file, modifying a file, etc.) in response to provoking the network activity reaction that was observed when provoking the network activity reaction in the testing environment. In this case, the security device may determine that the particular client device is associated with network activity corresponding to the network activity profile.

As further shown in FIG. 1, and by reference identifier 6, based on determining that the particular client device is associated with network activity corresponding to the network activity profile, the security device may provide a notification to an administrator device. For example, the security device may provide an indication that the particular client device is determined to be operating the malicious file, may request that the administrator device perform one or more remediation actions on the client device, may request that an information technology (IT) agent be dispatched to fix the client device, or the like. In another example, the security device may cause one or more remediation actions to be performed on the client device using one or more remediation techniques.

In this way, the security device may utilize a network activity profile determined using a testing environment to identify whether a malicious file is being operated on client devices of a customer network.

Figure 2:
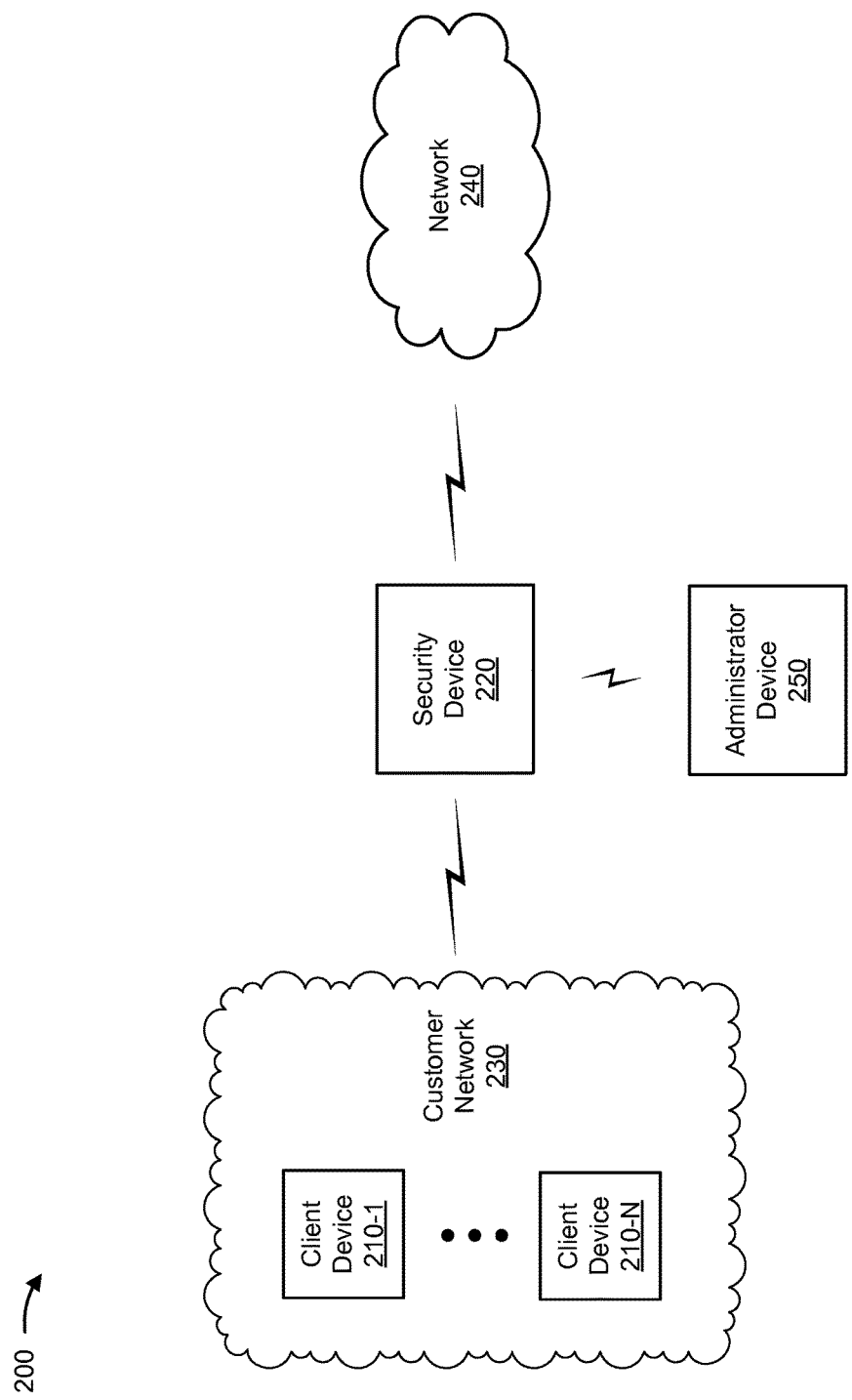
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, a network 240, and an administrator device 250. Devices of environment 200 may interconnect via wired connections, wireless connections, or a combination of wired and wireless connections.

Client device 210 may include one or more devices associated with receiving, generating, storing, processing, and/or providing information. For example, client device 210 may include a desktop computer, a laptop computer, a tablet computer, a mobile phone (e.g., a smart phone, a radiotelephone, etc.), a server, or a similar type of device. In some implementations, client device 210 may be capable of executing a malicious file, which may cause harm to client device 210, information stored by client device 210, a user of client device 210, and/or another client device 210. In some implementations, different client devices 210 may have different system configurations, and may be impacted by malicious files in different ways. For example, a first client device 210 may receive a malicious file and the malicious file may execute and infect the first client device 210 and a second client device 210 may receive the malicious file but the malicious file may fail to execute. In some implementations, client device 210 may reside on customer network 230.

Security device 220 may include one or more devices capable of processing and/or transferring network traffic associated with client device 210, and/or capable of monitoring network traffic for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. Additionally, or alternatively, communications may be routed to security device 220 when the communications are directed toward client device 210.

In some implementations, security device 220 may determine that a malicious file is operating on client device 210. For example, security device 220 may execute the malicious file in a testing environment (e.g., a sandbox environment), and may determine a network activity profile based on network activity from the testing environment. In this case, based on network activity associated with client device 210 matching the network activity profile, security device 220 may determine that the malicious file is operating on client device 210.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

Administrator device 250 may include one or more devices capable of performing monitoring for a network administrator, a system administrator, an IT agent, or the like. For example, administrator device 250 may include a computer, a server, a mobile device (e.g., a smartphone, a tablet computer, etc.), or the like. Administrator device 250 may receive information indicating that a malicious file is operating on a particular client device 210, and may cause an alert to be displayed for a user (e.g., the network administrator, the system administrator, the IT agent, etc.). In some implementations, administrator device 250 may cause a particular remediation action to be performed, may dispatch an IT agent to remediate a client device 210 on which the malicious file is operating, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
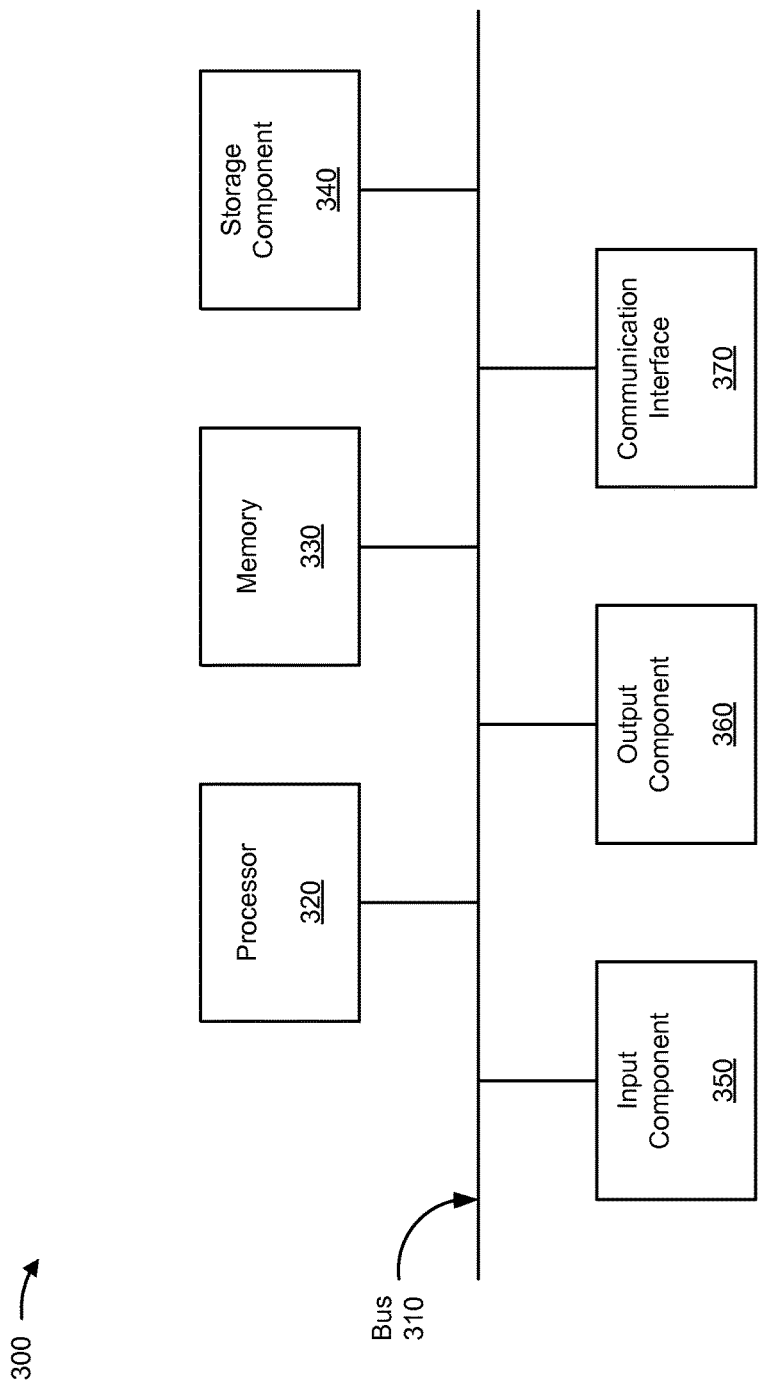
FIG. 3 is a diagram of example components of one or more devices of FIG. 2.

FIG. 3 is a diagram of example components of a device 300. Device 300 may correspond to client device 210, security device 220, and/or administrator device 250. In some implementations, client device 210, security device 220, and/or administrator device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
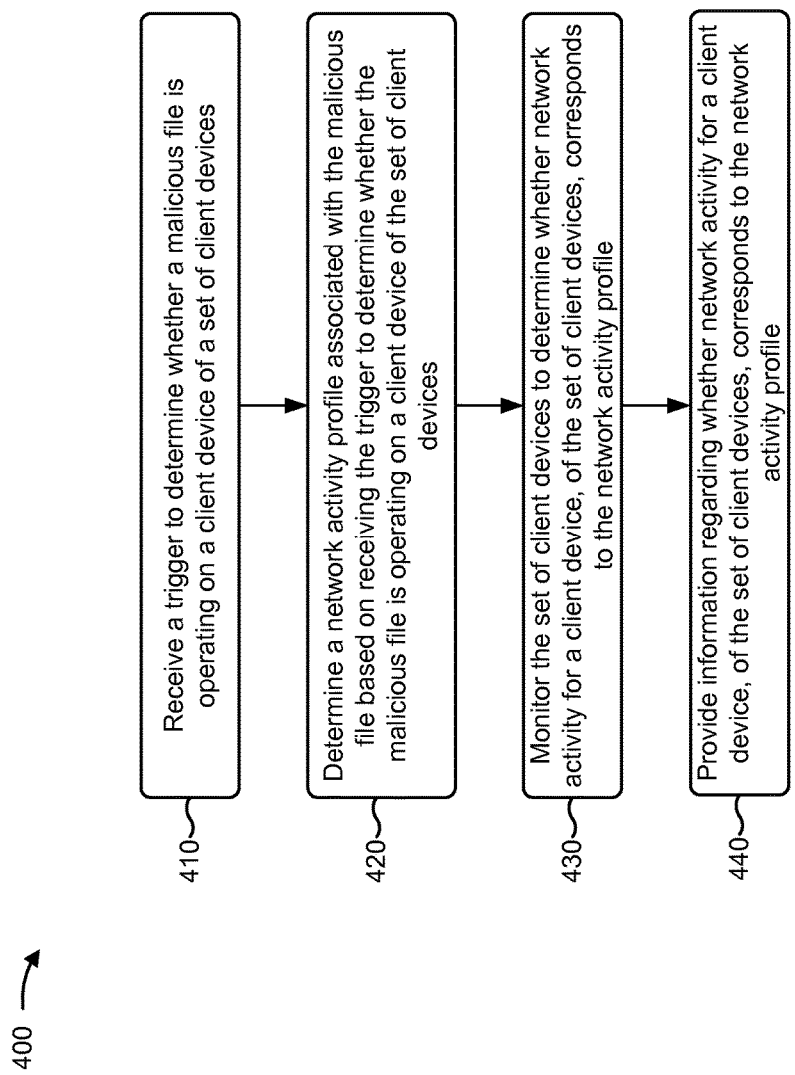
FIG. 4 is a flow chart of an example process for generating a network activity profile and identifying an infected client device.

FIG. 4 is a flow chart of an example process 400 for remotely remediating a malicious file on a client device. In some implementations, one or more process blocks of FIG. 4 may be performed by security device 220. Additionally, or alternatively, one or more process blocks of FIG. 4 may be performed by another device or a set of devices separate from or including security device 220, such as client device 210 and/or administrator device 250.

As shown in FIG. 4, process 400 may include receiving a trigger to determine whether a malicious file is operating on a client device of a set of client devices (block 410). For example, security device 220 may receive the trigger to determine whether the malicious file is operating (e.g., executing) on any client device 210 of the set of client devices 210. In some implementations, security device 220 may receive the trigger based on monitoring network activity associated with the set of client devices 210. For example, when security device 220 monitors network activity associated with the set of client devices 210, security device 220 may determine that a file, downloaded by a particular client device 210, is the malicious file. In this case, security device 220 may be triggered to determine whether the malicious file is operating on the particular client device 210, whether the malicious file is operating on other client devices 210, or the like.

In some implementations, security device 220 may receive information, from another device (e.g., another security device 220, administrator device 250, or the like), instructing security device 220 to determine whether the malicious file is operating on a particular client device 210. For example, another security device 220 may perform a malicious file detection on a first client device 210, may detect that the malicious file is present in a data structure of first client device 210, and may instruct security device 220 to determine whether the malicious file is operating on one or more second client devices 210.

In some implementations, security device 220 may obtain the malicious file when or after receiving the trigger. For example, security device 220 may obtain a copy of the malicious file, the malicious file, or the like when or after receiving the trigger. Additionally, or alternatively, security device 220 may obtain information associated with locating the malicious file, and security device 220 may locate a copy of the malicious file using the information associated with locating the malicious file. In some implementations, security device 220 may obtain other information regarding the malicious file, such as meta-data associated with the malicious file, contents of the malicious file, or the like, when or after receiving the trigger. For example, security device 220 may receive, from another security device 220, information from a malicious file data structure that is associated with describing behavior of the malicious file. In some implementations, security device 220 may obtain information regarding multiple malicious files. For example, security device 220 may obtain multiple malicious files for detection of operation on the set of client devices 210. In this case, the trigger may be a trigger to detect any of the malicious files as operating on the set of client devices 210.

As further shown in FIG. 4, process 400 may include determining a network activity profile associated with the malicious file based on receiving the trigger to determine whether the malicious file is operating on a client device of the set of client devices (block 420). For example, security device 220 may determine the network activity profile associated with the malicious file. The network activity profile may refer to information associated with network activity that corresponds to the malicious file operating on a particular client device 210, such as network addresses that are requested, quantities and/or distributions of packets that are sent/received, ports that are opened/utilized for communication, or the like.

In some implementations, security device 220 may determine the network activity profile based on analyzing the malicious file. For example, security device 220 may identify a set of network resources, such as device identifiers, network addresses (e.g., uniform resource locators (URLs), Internet protocol (IP) addresses, etc.), or the like, that are included in a malicious file binary. In some implementations, security device 220 may filter the set of network resources, such as based on a whitelist (e.g., a listing of trusted network resources). For example, security device 220 may determine that a network address for a search engine is included in the malicious file, and may filter the network address from the network activity profile based on the network address being associated with benign purposes common to other files, programs, processes, or the like.

Additionally, or alternatively, security device 220 may determine the network activity profile based on information associated with other malicious files. For example, security device 220 may determine behavior associated with a set of malicious files similar to the malicious file. In some implementations, security device 220 may analyze the file to determine the set of malicious files similar to the malicious file. For example, security device 220 may perform a hash of the malicious file, a fuzzy hash of the malicious file, static analysis of the malicious file, or the like.

Security device 220 may determine the network activity profile based on metadata associated with the malicious file, in some implementations. For example, security device 220 may utilize metadata regarding the malicious file (e.g., information identifying a compiling language of the malicious file, a compiling date of the malicious file, or the like) to search a data structure (e.g., a malicious file database), the Internet, or the like for information indicating what type of malicious purpose is associated with the malicious file, information indicating what types of network resources the malicious file may contact (e.g., to exfiltrate data, to replicate onto another client device 210, to infiltrate additional malicious files, etc.), or the like.

Security device 220 may determine the network activity profile by operating the malicious file in a testing environment (e.g., a sandbox environment), in some implementations. For example, security device 220 may configure a sandbox environment for executing the malicious file to determine network activity associated with the malicious file when the malicious file is operating. In some implementations, security device 220 may provide access to a particular quantity of files and/or system resources in the sandbox environment to facilitate generating the network activity profile. For example, security device 220 may establish a data structure storing dummy (i.e., fake) user information to determine whether the malicious file exfiltrates the dummy user information to a particular server associated with a particular network address. In some implementations, security device 220 may configure the testing environment based on a configuration of client device 210. For example, security device 220 may cause one or more files, peripherals, or the like associated with client device 210 to be included with the testing environment. In this way, security device 220 may generate a network activity profile associated with correlating particular network activity to the malicious file operating on a particular client device 210.

Security device 220 may monitor a set of ports and/or perform a port scan when operating the malicious file in the testing environment, in some implementations. For example, security device 220 may determine whether a particular port is opened, may perform analysis on communications utilizing the particular port, whether the particular port is associated with a malicious purpose (e.g., the particular port corresponds to a known protocol, a known vulnerability, a known backdoor, etc.), or the like. Additionally, or alternatively, security device 220 may determine whether behavior, associated with the particular port, is malicious behavior, such as by comparing the behavior to behavior of the port when the malicious file is not operating, utilizing a machine learning technique, analyzing a set of permissions granted when the particular port is open, or the like.

Security device 220 may provoke a network activity reaction when operating the malicious file in the testing environment, in some implementations. For example, security device 220 may cause a network adaptor to be disabled, reset an IP lease, or the like on a virtual machine associated with the testing environment to provoke a particular network activity reaction (e.g., to cause the malicious file to cause the virtual machine to access a network address, delete a file, modify a file, or the like). In this case, security device 220 may determine whether the same and/or a similar network activity reaction is provoked on client device 210.

In some implementations, security device 220 may generate a set of network activity profiles for a set of malicious files. For example, for a set of malicious files suspected of operating on client devices 210, encountered by security device 220, or the like, security device 220 may generate respective network activity profiles. In this case, security device 220 may store the set of network activity profiles via a data structure for utilization in future attempts to detect one or more of the set of malicious files on the set of client devices 210.

In some implementations, security device 220 may determine one or more suspicious behaviors based on operating the malicious file in the testing environment. For example, security device 220 may determine one or more IP addresses, which were attempted to be contacted and/or were contacted while operating the testing environment, that are associated with other (confirmed) malicious files. Additionally, or alternatively, security device 220 may analyze a property of network activity generated when operating the malicious file in the testing environment. For example, security device 220 may apply a machine learning technique to a type of network address contacted, a frequency with which the network address was contacted, a quantity of processes contacting the network address, or the like. In this way, security device 220 may determine anomalous behavior (e.g., contacting unknown addresses, queries to a particular address that satisfy a threshold increase over expected queries, etc.) that corresponds to the malicious file operating on a particular client device 210.

In some implementations, security device 220 may filter benign behavior that triggers a false positive result from the network activity profile. For example, security device 220 may compare network activity to a whitelist of benign network addresses. In this case, security device 220 may perform a frequency analysis to determine whether network activity associated with the benign network address satisfies a threshold signifying normal network activity. In contrast, security device 220 may determine that a quantity of requests to contact the benign network address satisfies another threshold indicating anomalous behavior, such as an attempted denial of service (DOS) attack. Additionally, or alternatively, security device 220 may remove a port, opened when the malicious file was operating in a testing environment, from the network activity profile based on determining that the network activity associated with the port was benign network activity. In this way, security device 220 may remove information that results in a false positive from the network activity profile and include information that results in a true positive in the network activity profile.

In some implementations, security device 220 may combine multiple different information sources to determine the network activity profile. For example, security device 220 may combine analysis of the malicious file, metadata associated with the malicious file, results of operating the malicious file in a testing environment, analysis of network addresses accessed by the malicious file, analysis of ports opened by the malicious file, a network activity reaction in response to provoking the network activity reaction, or the like in generating the network activity profile.

As further shown in FIG. 4, process 400 may include monitoring the set of client devices to determine whether network activity for a client device, of the set of client devices, corresponds to the network activity profile (block 430). For example, security device 220 may monitor network activity (e.g., network addresses accessed, ports opened, or the like) associated with the set of client devices 210 to determine whether a particular client device 210 is exhibiting behavior corresponding to the network activity profile. Additionally, or alternatively, security device 220 may provoke a network activity reaction to determine whether the provoked network activity reaction corresponds to a network activity reaction which was provoked in the testing environment. In some implementations, security device 220 may monitor a particular client device 210. For example, security device 220 may monitor the particular client device 210 that downloaded the malicious file. In some implementations, security device 220 may generate a score for network activity for a particular client device 210 as a measure of similarity of the network activity to the network activity profile. For example, security device 220 may generate a network activity score for network activity associated with client device 210, and may determine that the network activity score satisfies a threshold. In this case, security device 220 may determine that the malicious file is operating on client device 210 based on determining that the network activity score satisfies the threshold. In some implementations, security device 220 may determine that the malicious file is operating on client device 210 based on information that the malicious file is present on client device 210. For example, security device 220 may utilize whether client device 210 downloaded the malicious file as a factor in determining whether client device 210 is infected by the malicious file.

In some implementations, security device 220 may apply machine learning to the network activity to determine whether the network activity corresponds to the network activity profile. For example, security device 220 may generate a training data set using client devices 210 on which the malicious file is known to be operating or known not to be operating, and may utilize the training data set to train one or more machine learning algorithms with the network activity profile to identify a particular client device 210, of the set of client devices 210, on which the malicious file is operating. Additionally, or alternatively, security device 220 may use a machine learning algorithm that has been trained on a training data set and provided to security device 220 after being trained.

In some implementations, security device 220 may generate scores for a set of network activity profiles. For example, security device 220 may compare the network activity to the set of network activity profiles, may generate scores the for set of network activity profiles based on matches to the network activity, and may determine one or more malicious files, operating on one or more client devices 210, respectively associated with one or more scores that satisfy a threshold.

As further shown in FIG. 4, process 400 may include providing information regarding whether network activity for a client device, of the set of client devices, corresponds to the network activity profile (block 440). For example, security device 220 may provide information indicating that a particular client device 210 is infected by the malicious file (i.e., the malicious file is operating on the particular client device 210). In some implementations, security device 220 may provide the information to administrator device 250. For example, security device 220 may cause an alert, indicating that the particular client device 210 is infected by the malicious file, to be displayed on administrator device 250. Additionally, or alternatively, security device 220 may provide the information to the particular client device 210 to trigger a malicious file remediation program to activate, to notify a user, or the like.

In some implementations, client device 210 may provide a confidence score associated with the particular client device 210 indicating a confidence that client device 210 is/or is not infected. For example, client device 210 may generate a network activity score indicating an extent to which the network activity of the particular client device 210 matches the network activity profile. In some implementations, security device 220 may provide information to administrator device 250 indicating that no client device of the set of client devices 210 is infected. For example, when security device 220 monitors the network activity and fails to find a match with the network activity profile (e.g., a threshold match), security device 220 may indicate that the malicious file is not operating on the set of client devices 210.

In some implementations, security device 220 may cause a remediation action to be performed on the particular client device 210 based on determining that the particular client device 210 is infected. For example, security device 220 may cause the particular client device 210 to be quarantined, may cause an IT agent to be dispatched to fix the particular client device 210, may cause remediation software to be executed on client device 210, or the like. In this case, security device 220 may include a module associated with malicious file remediation that is triggered by determining that the malicious file is operating on a particular client device 210.

In some implementations, security device 220 may provide information indicating malicious files that may be operating on one or more client devices 210. For example, when security device 220 compares the network activity to multiple network activity profiles, security device 220 may provide information to administrator device 250 indicating which malicious files associated with network activity profiles are determined to be operating on one or more client devices 210.

In some implementations, security device 220 may provide information identifying behavior that is associated with indicating that client device 210 is infected by the malicious file. For example, security device 220 may identify one or more network addresses accessed by client device 210, one or more ports opened by client device 210, behavior of the one or more ports opened by client device 210, a network activity reaction provoked on client device 210, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although implementations are described herein in terms of determining a network activity profile and matching the network activity profile to network activity of client device 210, implementations, described herein, may also be utilized to monitor network activity of client device 210, match the network activity to a stored network activity profile, of a set of stored network activity profiles, and determine that a malicious file associated with the stored network activity profile is operating on client device 210. In this case, security device 220 may notify administrator device 250 regarding the malicious file identifies as operating on client device 210.

FIGS. 5A-5D are diagrams of an example implementation 500 relating to example process 400 shown in FIG. 4. FIGS. 5A-5D show an example of generating a network activity profile and identifying an infected client device.

Figure 5A:
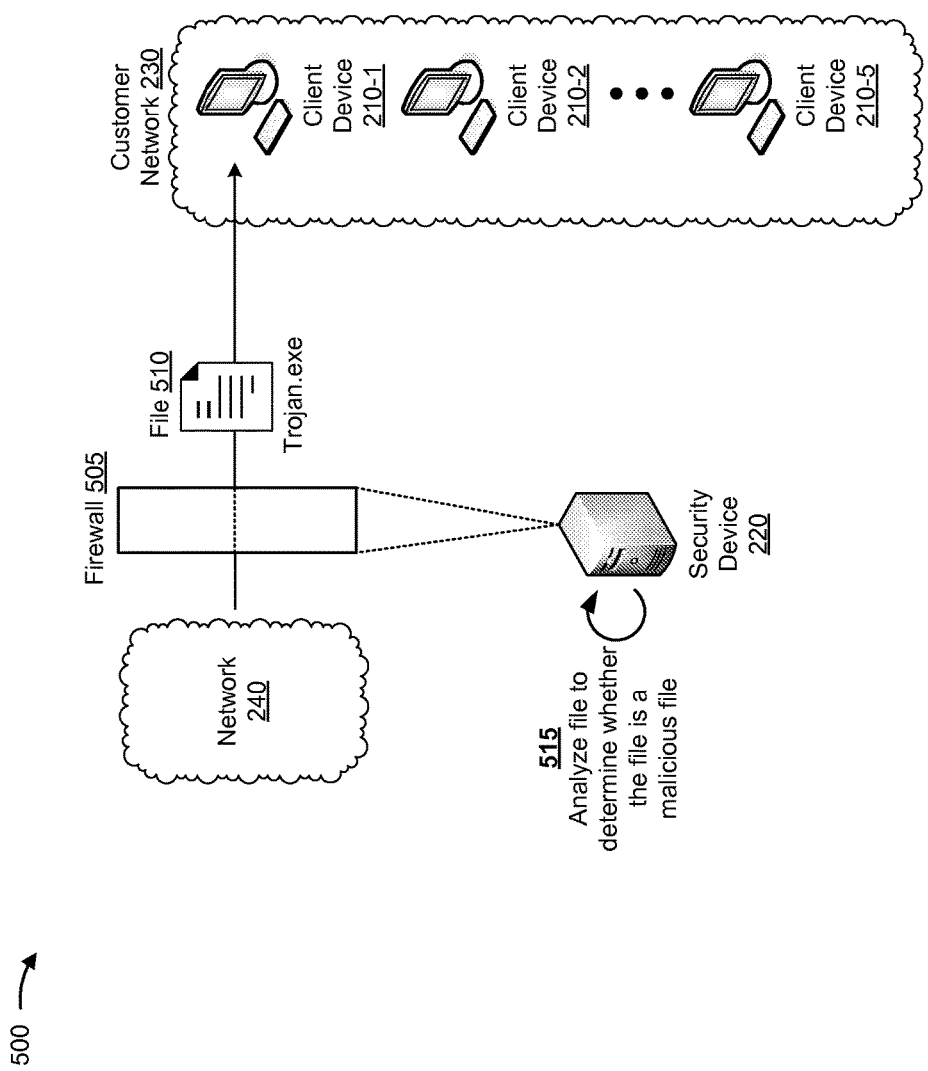

As shown in FIG. 5A, security device 220 may operate firewall 505 to monitor network traffic entering/exiting customer network 230. Customer network 230 includes a set of client devices 210-1 through 210-5. File 510 (e.g., "Trojan.exe") is received from network 240 and via firewall 505 by client device 210-1. As shown by reference number 515, security device 220 analyzes file 510 to determine whether the file 510 is a malicious file. Assume that security device 220 determines that the file 510 is a malicious file and is triggered to determine whether the malicious file is operating on client device 210-1 and/or one or more other client devices 210 of customer network 230.

As shown in FIG. 5B, and by reference number 520, security device 220 performs analysis on file 510 to generate a network activity profile. As shown by reference number 525, security device 220 generates a particular network activity profile that includes a set of URLs present in program code of file 510 (e.g., "search.com," "scam.net," "theft.com," etc.), a set of URLs accessed during sandboxing of file 510 (e.g., "files.net," "scam.net," "virus.com," etc.), and information regarding suspicious port activity determined when performing the analysis on file 510 (e.g., a particular port "1234" that was opened and is associated with a known backdoor exploit).

Some URLs, of the sets of URLs, may be benign (e.g., included to avoid malicious file detection, accessed by other benign processes during sandboxing, etc.). Other URLs, of the sets of URLs, may be common and may poorly correspond to the malicious file operating on a particular client device 210. For example, although "search.com" is present in each set of URLs, "search.com" may be accessed by client devices 210 during normal (uninfected) operation and may provide a relatively little indication that a client device 210 is infected. By comparison, another URL, "virus.com" may be determined to be relatively rarely accessed during normal operation, and may provide a relatively strong indication that client device 210 is infected.

Assume that security device 220 processes the network activity profile using a set of machine learning techniques (that have been trained on training data sets, such as data sets associated with previous malicious files, normal (uninfected) network activity, or the like) to determine relative weights for each URL, each port monitored during the port scan, etc. in determining whether a particular client device 210 is infected by file 510.

As shown in FIG. 5C, and by reference number 530, security device 220 monitors network activity (e.g., via firewall 505) to determine a match to the network activity profile. As shown by reference number 535, a quantity of network traffic enters/exits customer networks 230 via firewall 505. As shown by reference number 540, when monitoring the network activity, security device 220 performs a set of port scans on the set of client devices 210 to determine network activity associated with ports of each client device 210 of the set of client devices 210.

Figure 5D:
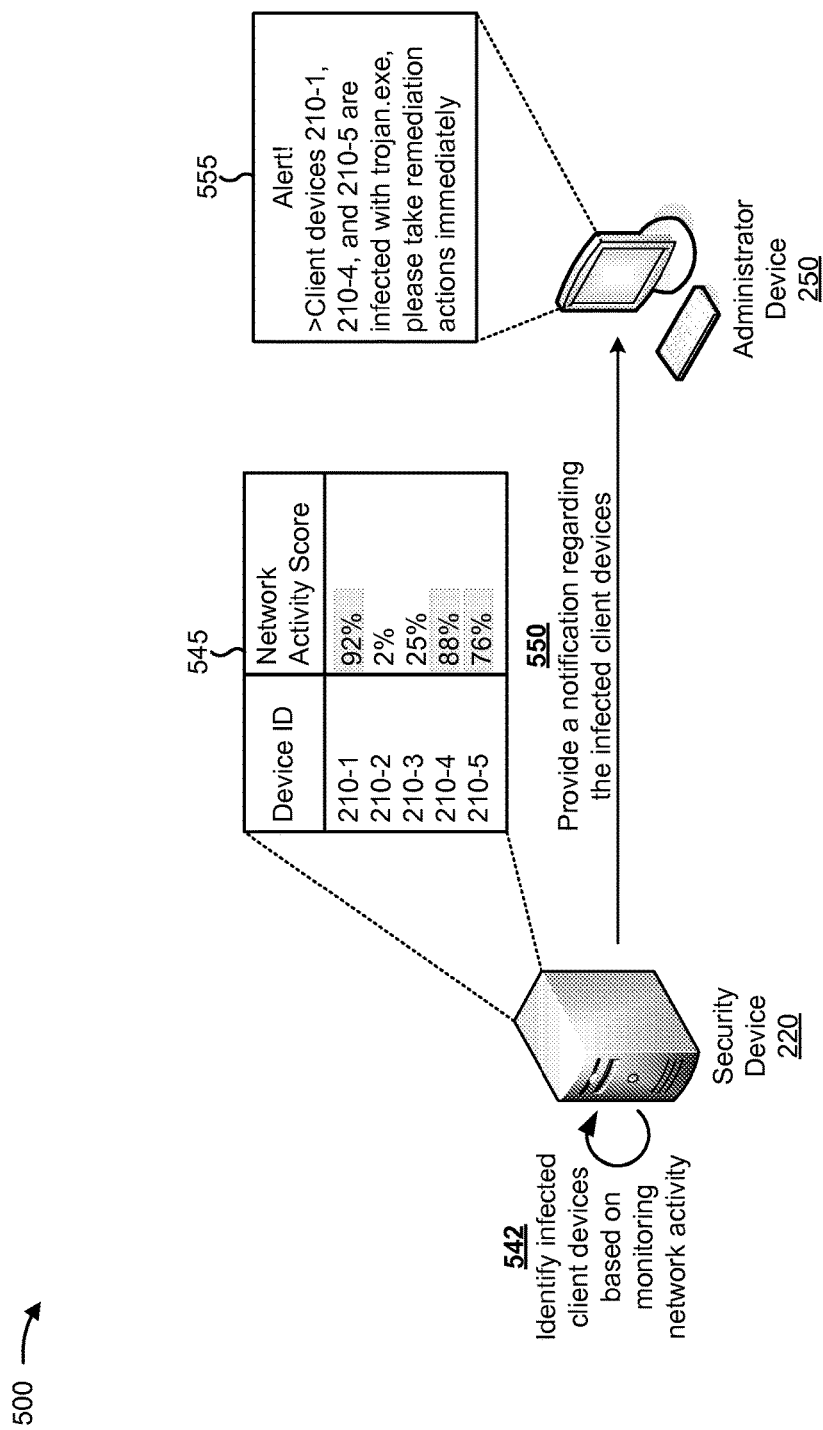

As shown in FIG. 5D, and by reference number 542, security device 220 identifies infected client devices 210 based on monitoring the network activity. As shown by reference number 545, security device 220 generates, for each client device 210, a network activity score representing a measure of similarity of network activity of each client device 210 to the network activity profile. Based on comparing the network activity scores to a threshold (e.g., a 75% match), security device 220 identifies client device 210-1, client device 210-4, and client device 210-5 as being infected by file 510. As shown by reference number 550, security device 220 provides, to administrator device 250, a notification regarding the infected client devices 210, and, as shown by reference number 555, the notification is displayed as an alert on administrator device 250.

In another example, security device 220 may monitor the network activity of a client device 210, and may match the network activity to a network activity profile, of a set of network activity profiles, thereby identifying a malicious file corresponding to the network activity profile as operating on client device 210.

As indicated above, FIGS. 5A-5D are provided merely as an example. Other examples are possible and may differ from what was described with regard to FIGS. 5A-5D.

In this way, security device 220 may generate a network activity profile for a malicious file based on analyzing the malicious file, sandboxing the malicious file, or the like. Moreover, security device 220 may monitor network traffic to determine whether network activity for a particular client device 210 matches the network activity profile, indicating that the particular client device 210 is infected by the malicious file.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive a malicious file;
provoke, based on receiving the malicious file, a network activity reaction when operating the malicious file in a testing environment;
determine, based on provoking the network activity reaction, a network activity profile associated with the malicious file,
the network activity profile including information regarding at least one of:
one or more requested network addresses,
quantities of packets sent or received,
distributions of packets sent or received,
one or more ports that are opened for communication, or
one or more ports that are utilized for communication;
determine whether network activity for one or more client devices corresponds to the network activity profile;
determine that the one or more client devices are infected with the malicious file based on the network activity having a threshold similarity to the network activity profile; and
cause, based on determining that the one or more client devices are infected with the malicious file, a remediation action to be performed on the one or more client devices.

2. The device of claim 1, where the one or more processors are further to:
monitor the network activity; and
receive a trigger to determine whether the malicious file is operating on the one or more client devices based on monitoring the network activity.

3. The device of claim 1, where the one or more processors are further to:
monitor the network activity;
determine, based monitoring the network activity, that a file, downloaded by the one or more client devices, is the malicious file; and
receive a trigger to determine whether the malicious file is operating on the one or more client devices based on determining that the file is the malicious file.

4. The device of claim 1, where the one or more client devices are one or more first client devices;
where the one or more processors are further to:
determine whether the malicious file is operating on one or more second client devices based on determining that the one or more first client devices are infected with the malicious file.

5. The device of claim 1, where the one or more processors, when receiving the malicious file, are to:
obtain the malicious file based on receiving a trigger to determine whether the malicious file is operating on the one or more client devices.

6. The device of claim 1, where the one or more processors are further to:
receive a trigger to determine whether the malicious file is operating on the one or more client devices; and
obtain information regarding the malicious file based on receiving the trigger,
the information regarding the malicious file including at least one of:
metadata associated with the malicious file, or
contents of the malicious file.

7. A method, comprising:
receiving, by a device, a malicious file;
provoking, by the device and based on receiving the malicious file, a network activity reaction when operating the malicious file in a testing environment;
determining, by the device and based on provoking the network activity reaction, a network activity profile associated with the malicious file,
the network activity profile including information regarding at least one of:
one or more requested network addresses,
quantities of packets sent or received,
distributions of packets sent or received,
one or more ports that are opened for communication, or
one or more ports that are utilized for communication;
determining, by the device, whether network activity for one or more client devices corresponds to the network activity profile;
determining, by the device, that the one or more client devices are infected with the malicious file based on the network activity having a threshold similarity to the network activity profile; and
causing, by the device and based on determining that the one or more client devices are infected with the malicious file, a remediation action to be performed on the one or more client devices.

8. The method of claim 7, where determining the network activity profile comprises:
determining the network activity profile based on analyzing the malicious file.

9. The method of claim 7, where the information is first information; and
where determining the network activity profile comprises:
determining second information associated with the malicious file,
the second information including at least one of:
one or more device identifiers, or
one or more network addresses.

10. The method of claim 7, further comprising:
filtering a set of network resources based on a whitelist.

11. The method of claim 7, where determining the network activity profile comprises:
determining the network activity profile based on information associated with other malicious files.

12. The method of claim 7, further comprising:
receiving a trigger to determine whether one or more malicious files are operating on the one or more client devices; and
analyzing a set of malicious files similar to the malicious file based on receiving the trigger.

13. The method of claim 7, where determining the network activity profile comprises:
determining the network activity profile based on metadata associated with the malicious file.

14. A non-transitory computer-readable medium storing instructions, the instructions comprising:
one or more instructions that, when executed by one or more processors, cause the one or more processors to:
receive a malicious file;
provoke, based on receiving the malicious file, a network activity reaction when operating the malicious file in a testing environment;
determine, based on provoking the network activity reaction, a network activity profile associated with the malicious file,
the network activity profile including information regarding at least one of:
one or more requested network addresses,
quantities of packets sent or received,
distributions of packets sent or received,
one or more ports that are opened for communication, or
one or more ports that are utilized for communication;
determine whether network activity for one or more client devices corresponds to the network activity profile;
determine that the one or more client devices are infected with the malicious file based on the network activity having a threshold similarity to the network activity profile; and
cause, based on determining that that the one or more client devices are infected with the malicious file, a remediation action to be performed on the one or more client devices.

15. The non-transitory computer-readable medium of claim 14, where the one or more instructions that, when executed by the one or more processors, further cause the one or more processors to:
utilize metadata associated with the malicious file to search for information associated with the malicious file.

16. The non-transitory computer-readable medium of claim 14, where the one or more instructions that, when executed by the one or more processors, further cause the one or more processors to:

provide access to one or more files or system resources; and generate the network activity profile based on providing access to the one or more files or the system resources.

17. The non-transitory computer-readable medium of claim 14, where the one or more instructions that, when executed by the one or more processors, further cause the one or more processors to:

establish a data structure storing dummy user information; and determine whether the malicious file exfiltrates the dummy user information to a particular server.

18. The non-transitory computer-readable medium of claim 14, where the one or more instructions that, when executed by the one or more processors, further cause the one or more processors to:

cause at least one of:
 a network adaptor to be disabled, or
 a reset of an IP lease; and determine whether a network activity reaction is provoked based on causing the at least one of:
 the network adaptor to be disabled, or
 the reset of the IP lease.

19. The device of claim 1, where the one or more processors, when causing the remediation action to be performed, are to:

cause the one or more client devices to be quarantined, or cause a remediation software to be executed on the one or more client devices.

20. The non-transitory computer-readable medium of claim 14, where the one or more instructions that, when executed by the one or more processors, further cause the one or more processors to:

receive a trigger;

obtain, based on receiving the trigger, location information associated with the malicious file; and where the one or more instructions, that cause the one or more processors to receive the malicious file, cause the one or more processors to:

receive the malicious file from a location identified by the location information.

* * * * *